(12) United States Patent
Inglefield (10) Patent No.: US 6,638,572 B1
(45) Date of Patent: Oct. 28, 2003

(54) HEAT RESISTANT MATERIAL FOR MOLDS AND OTHER ARTICLES

(76) Inventor: Charles F. Inglefield, 19343 Frazier Dr., Rocky River, OH (US) 44116

( * ) Notice: Subject to any disclaimer, the term of this patent is extended or adjusted under 35 U.S.C. 154(b) by 0 days.

(21) Appl. No.: 09/893,273

(22) Filed: Jun. 27, 2001

(51) Int. Cl.$^7$ ............................ B05D 3/02; L08L 83/04; B28B 11/06; B29C 33/40
(52) U.S. Cl. .................... 427/376.2; 264/117; 264/125; 264/126; 264/128; 264/131; 264/176.1; 264/219; 264/319; 264/331.11; 264/327; 264/440; 264/460; 264/463; 264/464; 264/477; 264/478; 264/654; 264/657; 427/374.4; 427/387; 427/314; 524/588; 525/474
(58) Field of Search ................................ 264/109, 117, 264/126, 128, 131, 125, 176.1, 209.1, 219, 319, 330, 331.11, 320, 327, 440, 453, 478, 654, 657, 452, 460, 463, 464, 477, 624; 525/474; 524/588; 156/242; 428/34.1, 35.7, 447; 164/91; 29/889; 427/374.4, 376.2, 387, 458, 472, 775, 532, 542, 314

(56) References Cited

U.S. PATENT DOCUMENTS

| | | | |
|---|---|---|---|
| 3,172,176 A | | 3/1965 | Greenwood |
| 3,628,985 A | * | 12/1971 | Hider et al. ................. 427/228 |
| 4,769,197 A | | 9/1988 | Kromrey |
| 4,795,600 A | * | 1/1989 | Kromrey .................... 264/130 |
| 4,962,162 A | | 10/1990 | Kosuda et al. |
| 5,167,876 A | | 12/1992 | Lem et al. |
| 5,219,498 A | | 6/1993 | Keller et al. |
| 5,342,650 A | * | 8/1994 | Daly, III .................... 427/178 |
| 5,523,374 A | | 6/1996 | Bard et al. |
| 5,552,466 A | | 9/1996 | Beckley et al. |
| 5,612,399 A | | 3/1997 | Beckley et al. |
| 5,623,030 A | * | 4/1997 | Tsumura et al. ............ 525/478 |
| 5,632,925 A | * | 5/1997 | Moulton et al. ............ 249/115 |
| 5,747,608 A | * | 5/1998 | Katsoulis et al. ........... 525/477 |
| 5,884,688 A | | 3/1999 | Hinton et al. |
| 6,183,873 B1 | | 2/2001 | Clarke |
| 6,265,333 B1 | | 7/2001 | Dzenis et al. |

OTHER PUBLICATIONS

Publication by General Electric Company entitled "GE Silicones" and "Material Safety Data Sheet Silicone Molding Compound", publication date unknown, but date printed is Mar. 28, 2000.
Publication by GE Silicones entitled "MC550BK1", publication date unknown, but prior to Jun. 5, 2001.
Publication by GE Toshiba Silicones Co., Ltd. entitled "TRIPLUS–Solventless Silicone Resin Blend System", publication date unknown, last copyright date 2000.
Publication by GE Silicones entitled "Technical Library–TRIPLUS–Solventless Silicone Resin Blend System", publication date unknown but copyright date 2001.
Publication GE Silicones and TRIPLUS 179, publication date unknown but prior to Apr. 20, 2001.
GE Silicones publication for product TPR178, entitled "Material Safety Data Sheet Polyalkylsiloxanes", publication date unknown, printed Mar. 28, 2000.

* cited by examiner

*Primary Examiner*—Robert Dawson
*Assistant Examiner*—Jeffrey B. Robertson
(74) *Attorney, Agent, or Firm*—Tarolli, Sundheim, Covell & Tummino L.L.P.

(57) ABSTRACT

A particulate silicone based material and method for forming a heat resistant composite is provided. The particulate silicone based material is heated to a temperature between about 200° F. and about 400° F. The particulate silicone based material is cooled until a solid composite is formed. The solid composite is resistant to melting and thermal decomposition when heated to temperatures of at least 3000° F. The particulate silicone based material may be formed by mixing liquid silicone resin with a catalyst and powdered silicone molding compound.

56 Claims, 3 Drawing Sheets

HEAT RESISTANT MATERIAL FOR MOLDS AND OTHER ARTICLES

FIELD OF THE INVENTION

The present invention relates to a heat resistant material, and to the making of articles which are at least partially formed of the heat resistant material.

BACKGROUND OF THE INVENTION

The casting of metal articles using sand molds and sand cores is well known in the art. A sand mold can be made from a mixture of sand and an organic binder by packing the mixture loosely or tightly around a pattern. The pattern is then removed, leaving a cavity in the sand that replicates the shape of the pattern. Once the organic binder is shape-stabilized by a curing technique, the cavity in the mold is filled with a molten metal by pouring the molten metal into the mold.

Sand mold cores can be made by placing a sand and binder mixture into a core box. There, the sand and binder mixture takes the shape of the cavity in the box, becomes hard, and is removed. After the mold is made, the core is then set in the mold. Molten metal is poured in the mold and fills the mold except where the sand core is present.

The binder materials used in making the sand molds, and sand cores can include inorganic binders, organic binders, and organometallic binders. Oraganometallic binders are uniquely suited for use as binders for sand molds and sand cores because they provide strength to the sand molds and sand cores at extremely low binder levels. Additionally, organometallic binders can be used to bind particles together to make shapes directly.

U.S. Pat. No. 5,884,688 discloses a method of fabricating shaped bodies such as negatives of parts to be made, as well as, shapes directly. The method comprises coating sand with liquid organic-metallic binder, forming a shape from said binder mixture, and hardening said binder mixture to form the shaped body. One organometallic binder is a polyureasilazane.

U.S. Pat. No. 5,552,466 discloses a method of producing an article with high temperature and thermal shock resistance comprising forming a blend of at least one lower viscosity silicone polymer. The blend is disclosed as being "cermitizable" at a temperature above about 1100° F. (590° C.). An article, formed in accordance with the patent, contains a layer of material formed from a silicone blend.

SUMMARY OF THE INVENTION

The present invention relates to particulate material and method for forming a heat resistant composite. A particulate silicone based material is provided. The particulate silicone based material is heated to a temperature between about 200° F. and 400° F. The particulate silicone based material is cooled until a solid composite is formed. The solid composite is resistant to melting and thermal decomposition when heated to temperatures of at least about 3000° F. The particulate silicone based material may be formed by mixing liquid silicone resin with a catalyst and powdered silicone molding compound. The result may be a particulate which appears to be dry.

It should be understood that the silicone based material of the present invention has many different uses. For example, the silicone based material of the present invention may be used to form a core or mold which is used in forming other articles. Alternatively, the silicone based material may be used to form an article itself. As another alternative, the silicone based material may be used as a covering. It is contemplated that the silicone based material of the present invention may be used in many different ways in addition to the specific ways described herein.

BRIEF DESCRIPTION OF THE DRAWINGS

The foregoing and other features of the present invention will become more apparent to one skilled in the art upon consideration of the following description of the invention and the accompanying drawing in which.

DESCRIPTION

Silicone Based Material

The present invention relates to a particulate silicone based material that can be used form a composite that has a high temperature resistance and thermal shock resistance. By "high temperature resistance" it is meant the ability of the material to withstand melting and/or decomposition when exposed to high temperatures (i.e., temperatures greater than about 3000° F.). By "thermal shock resistance" it is meant the ability of the material to withstand stress induced within the material when the material is exposed to a sudden temperature increase.

The dry, particulate silicone based material is prepared by adding to a conventional mixing apparatus a silicone molding compound, a silicone resin, and a catalyst. The silicone molding compound is a powder. The silicone resin is a liquid. The catalyst is a powder. The resulting dry particulate has an appearance similar to the appearance of a dry, gray, flour with small lumps. The resulting dry particulate is a free flowing powder which is referred to herein as a silicone based material.

The silicone molding compound is processed through a hammer mill to form a powder that contains particles of silica and a silsesquioxane polymer. The silsesquioxane polymer has the general structural repeating unit $RSiO3/2$, wherein R is a methyl group, a phenyl group, or a mixture of both. The silsesquioxane polymer is believed to have a number of structures, including the following structures:

A preferred silicone molding compound that includes silica and a silsesquioxane polymer is MC550BK1which may be referred to as MCS550. MC550 is commercially available from GE Silicones of Waterford, N.Y. in the form of granular particles. The exact chemical composition of MC550 is not known; however, a material safety data sheet published by GE Silicones states that MC550 includes, by weight of the MC550, about 60% to about 80% fused silica, about 10% to about 30% fibrous glass, about 10% to about 5% amorphous silica, and about 10% to about 30% of a dimethyl silicone polymer with phenylsesquisiloxane. MC550 is precatalyzed so that granular particles of MC550 upon being heated to a temperature of about 177° C. to 193° C. cures into a solid mass.

The commercially available, granular molding compound, that is, MC550, is processed to form a powder. The amount of powdered silicone molding compound added to the to the conventional mixing apparatus is preferably about 90% to about 98% by weight, based on the combined weight of the silicone molding compound, the silicone resin, and the catalyst. More preferably, the amount of silicone molding compound added to the conventional mixing apparatus is about 95% by weight, based on the combined weight of the silicone molding compound, the silicone resin, and the catalyst.

The silicone resin of the present invention is a liquid silicone polymer at room temperature. The silicone resin, when mixed with the silicone molding compound wets the silicone molding compound and is absorbed by the silicone molding compound. Examples of silicone resins that are liquids at room temperature and that are capable of being absorbed by the silicone transfer molding compound include polydiorganosiloxane homopolymers such as silanol terminated polydiorganosiloxane polymers, methyl siloxane resins, and mixtures thereof.

A preferred silicone resin is a mixture of polydiogana-disiloxane resins commercially available from GE Silicones of Waterford, N.Y. under the tradename TRIPLUS. TRIPLUS is a solventless silicone resin system that includes a dimethylpolysiloxane silanol (TPR 178) and a methylsiloxane resin (TPR 179).

The weight ratio of TPR 178 to TPR 179 utilized in the silicone based material effects the hardness of the composite formed the silicone based material. As the weight ratio of TPR 178 relative to TPR 179 in the silicone base material increases, the durometer hardness of the composite formed from the silicone based material increases. Conversely, as the weight percentage of TPR 178 to TPR 179 decreases, the durometer hardness of the composite material formed the silicone based material decreases. Preferably, the weight ratio of TPR 178 to TPR 179 in the silicone resin is about 1:2 to about 2:1. More preferably, the weight ratio of TPR 178 to TPR 179 in the silicone resin is about 1:1.

Examples of other commercially available polydiorganosiloxane homopolymers similar to TRIPLUS are commercially available from Dow Corning, under the following trade names: DC-801, DC-804, DC-805, DC-806A, DC-808, DC-840, DC-2103, DC-2104, DCQ-1-2529, DCQ-1-2530, DCQ-2531, P50X, and P80X.

The amount of silicone resin added to the to the conventional mixing apparatus is preferably about 2% to about 10% by weight, based on the combined weight of the silicone molding compound, the silicone resin, and the catalyst. More preferably, the amount of silicone resin added to the conventional mixing apparatus is about 5% by weight, based on the combined weight of the silicone molding compound, the silicone resin, and the catalyst.

The catalyst of the present invention is a metal powder that when mixed and heated with the silicone resin facilitates curing of the silicone resin. Preferred catalysts are zirconium and zinc octoate. Examples of other catalysts that can be used to cure the silicone resin are cobalt octoate, iron octoate, and stannous octoate.

The amount of catalyst added to the conventional mixing apparatus is that amount effective to initiate curing of the silicone resin when the silicone based material is heated to a temperature of at least about 200° F. A preferred amount of catalyst added to the conventional mixing apparatus is up to about 0.50% by weight, based on the weight of the silicone molding compound, the silicone resin, and the catalyst. A more preferred amount of catalyst added to the conventional mixing apparatus is about 0.1% by weight, based on the weight of the silicone molding compound, the silicone resin, and the catalyst.

In order to reinforce the silicone based material and the composite formed from the silicone based material, a filler may be added to the conventional mixing apparatus and mixed with the silicone molding compound, the silicone resin, and the catalyst. The filler material may be a fibrous material, a particulate material, or a combination thereof. Preferably, the filler is composed of discontinuous fiber such as whiskers, particles, and mixtures thereof.

A preferred filler material that may be added to the conventional mixing apparatus and mixed with the silicone molding compound, the silicone resin, and the catalyst is a heat resistant filler material. Heat resistant filler materials for use in composites are well known in the art. Preferred heat resistant filler materials include a talc filler such as CANTAL, chopped fiberglass strands, a mineral fiber such as LAPINOUS, and mixtures thereof.

The amount of filler material added to the conventional mixing apparatus and mixed with the silicone molding compound, the silicone resin, and the catalyst, will vary with the end use of the composite. A preferred amount of filler material added to the conventional mixing apparatus and mixed with the silicone molding compound, the silicone resin, and the catalyst is that amount sufficient to be effective for imparting mechanical and thermal characteristics required for the end use of the composite. More preferably, the amount of filler material added to the conventional mixing apparatus and mixed with the silicone molding compound, silicone resin, and catalyst is up to about 35% by weight, based on the combined weight of the silicone molding compound, the silicone resin, the catalyst, and the filler material.

The silicone molding compound, the silicone resin, the catalyst, and the filler, if utilized, are blended in the conventional mixing apparatus until a uniform mixture is achieved. The blended mixture is a dry particulate having the consistency of a very fine sand and is referred to herein as the silicone based material. The average particle size of the blended mixture forming the silicone based material may be reduced by grinding or milling the particles of the blended mixture. The particulate silicone based material so formed is a dry, free flowing powder and has the consistency of confectionary sugar with small lumps.

Forming A Composite Article

When the silicone based material is heated to a temperature between about 200° F. and about 400° F. for a period of time, the discrete particles of the dry, free flowing powder become interconnected. As this occurs, the particle size appears to increase. This apparent increase in particle size is believed to be the result of interconnection of relatively fine particles of the silicone based material. Thus, it is believed that there is an agglomeration of fine particles to form coarse particles when the silicone based material is heated to a temperature between about 200° F. and about 400° F.

At the same time that the particle size is apparently increasing, the adjacent particles are interconnecting to form a solid unitary composite article. Although it is believed that the fine particles of the silicone based material are interconnecting to form coarser particles which are interconnected to form a solid unitary composite article, the fine particles may be interconnecting without forming coarser particles. When the fine particles of the silicone based material are tightly packed, it appears that the fine particles become interconnected with little or no increase in particle size.

When the one-piece article is initially formed by interconnection of particles of the silicone based material and is still at a temperature of about 200° F. and about 400° F., the article can be easily deformed plastically by the application of force to the article. When the one-piece article is removed from the furnace and has cooled to a temperature below 200° F. and above ambient temperature, the one-piece article can be manually deformed to change the configuration of the article. At this time, the one-piece article is malleable and can be manually deformed to plastically change the configuration of the article in much the same manner as in which modeling clay is manually deformed.

As the one-piece article continues to cool, the article becomes more resistant to plastic deformation. When the one-piece article has cooled to ambient temperature, the one-piece article is rigid. However, the one-piece article does not become overly brittle as it becomes rigid.

When the one-piece article was formed as a disc having a diameter of seven centimeters (7 cm) and a thickness of one and a quarter centimeters (1.25 cm), the disc broke into several large pieces when it was placed on a cement floor and struck with a hammer. The disc did not shatter in a manner similar to the manner in which glass shatters when struck by a hammer. However, prior to cooling of the disc to ambient temperature, the disc was sufficiently malleable to enable the disc to be plastically deformed by the manual application of force to the disc.

It is theorized that heating and cooling of the silicone based material causes the silicone polymers in the silicone based material to cross-link and form a rigid three-dimensional silicone polymer network. It is also believed that the oxygen in the silicone polymer network forms hydrogen bonds with the pendant hydroxyl groups of silica from the silicone molding compound, as shown below:

The hydrogen bonding of the silicone polymer network with the silica is advantageous because the hydrogen bonding increases the temperature resistance and thermal shock resistance of the solid composite.

For instance, the solid composite so formed was heated in an oven to a temperature of at least about 3000° F. upon being heated to a temperature of at least about 3000° F. the solid composite did not melt or thermally decompose. Moreover, the solid composite was exposed to a flame having a temperature of about 5000° F. The area of the solid composite exposed to the flame did not melt or thermally decompose. Additionally, upon cooling, the area of the solid composite exposed to the flame exhibited no evidence of thermal shock such as stress cracking.

The particulate silicone based material of the present invention can be used to form, or at least partially form various articles that require high temperature resistance and resistance to thermal shock. Many different types of articles can be formed of the silicone based material, such as coatings, engine components, and furnace linings. It should be understood that the foregoing are merely some examples of the many different uses for articles formed or partially formed of the silicone based material of the present invention.

Mold

Figure 1:
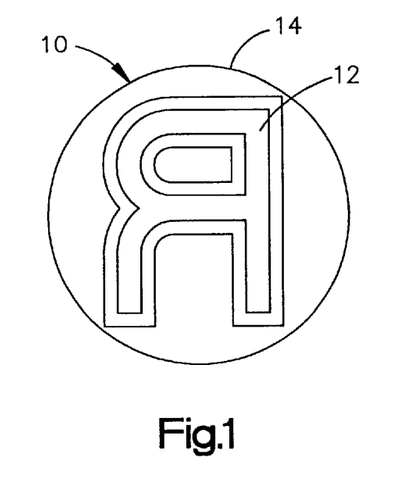
FIG. 1 is a schematic illustration of a casting mold formed of silicone based material in accordance with one feature of the present invention.

In accordance with one embodiment of the present invention the particulate silicone based material can be used to form a mold and/or core for the casting molten material such as a molten metal. FIG. 1 is a schematic illustration of a mold 10. The mold 10 comprises a first body 14 and a first article defining cavity 12. The first article defining cavity 12 has the shape and size of an article to be cast using the casting mold 10.

The casting mold may also include a second body (not shown) that may be affixed to the first body. The second body can have a second article defining cavity which is complementary in size and shape to the first article defining cavity. The second body is formed in the same way and of the same material as the first body 14. When the mold includes a second body, which is affixed to the first body, the first body and/or the second body can include a sprue for admitting molten metal into the first article defining cavity and the second article defining cavity.

Figure 2:
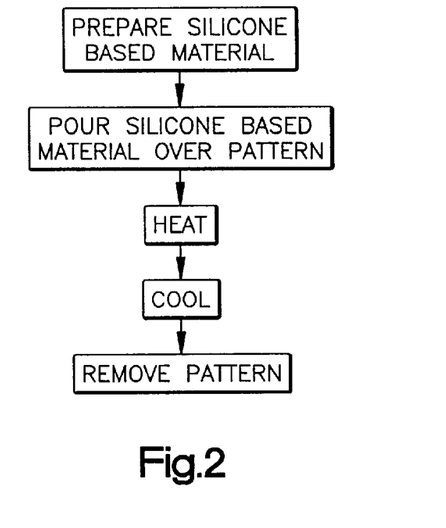
FIG. 2 is a schematic block diagram illustrating a method of forming the casting mold of FIG. 1.

FIG. 2 is a block flow diagram of a method of preparing the mold 10 of FIG. 1. The casting mold 10 is prepared by mixing the silicone molding compound (MC550), the silicone resin, the catalyst, and filler, if utilized, to form the dry, free flowing, particulate silicone based material.

An article defining pattern is placed in a container. The specific mold 10 illustrated in FIG. 1 is to be used to cast a metal article having the configuration of the letter "R". Therefore, the pattern and mold cavity 12 have configurations which are functions of the configuration of the letter "R".

An amount of dry powdered silicone based material is then transferred to the container and placed over the article defining pattern. The powder forming the silicone based material can be transferred to the container by pouring the free flowing powder forming the silicone based material into the container or injecting the silicone based material into the container. The amount of particulate silicone based material transferred to the container is that amount effective to cover the article defining pattern to an adequate depth. About ½ inch above the highest point of the article defining pattern is normally an adequate depth of the particulate silicone based material over the article defining pattern.

Once the particulate silicone based material covers the article defining pattern, pressure may be applied by a pressing assembly to the particulate silicone based material covering the article defining pattern to compact the particulate silicone based material. The greater the pressure utilized to pack the powdered silicone based material into the container holding the article defining pattern, the finer will be the particles formed and interconnected during heating of the silicone based material to a temperature of about 200° F. to about 400° F. Thus, if the particulate silicone based material is merely poured into the container holding the article defining pattern, without packing of the silicone based material, relatively coarse particles are formed and interconnected upon heating of the silicone based material. If the particulate silicone based material is firmly packed into the container holding the article defining pattern, relatively fine particles are formed and interconnected upon heating of the silicone based material.

The container, holding the article defining pattern and particulate silicone based material, may be placed in a conventional apparatus for heating such as an oven. The container, article defining pattern, and silicone based material are heated to a temperature of about 200° F. to about 400° F. Although the particulate silicone based material was lightly packed into the container before the container was placed in the heating apparatus, pressure was not applied against the particulate silicone based material while it was in the heating apparatus. As the silicone based material is heated, the particles of the silicone based material increase in size and become interconnected to form a unitary, one-piece composite article.

In the present example, the composite one-piece article is the mold 10. The composite article, that is, the mold 10, includes silicone polymers which form a continuous material and silica which forms a discontinuous material. The discontinuous material may also include filler material.

After being at a temperature of between about 200° F. and 400° F. for a period of time, for example about thirty minutes, the container, with the interconnected particles of the silicone based material therein, is removed from the oven and allowed to cool. Upon cooling to ambient (room) temperature (70° F.), the silicone based material forms a rigid composite. The container and the article defining pattern are then separated from the solid composite to form the casting mold 10 with the first article defining cavity 14, as shown in FIG. 1.

Surprisingly, it has been found that the casting mold 10 produced by the process of the present invention has a smooth surface that is free of macro-irregularities such as surface imperfections and cracks that are visible to the naked eye. It is believed that this smooth surface can be attributed to using a minimal amount of a solventless binder. By using only a minimal amount of solventless binder, the silicone base material, when curing, produces a minimal amount of off-gassing (i.e., bubbles of gas by-products that are formed by the curing chemical reaction). Gas bubbles, which form on the surface of the casting mold, have previously been one source of irregularities in a casting mold.

The mold 10 is resistant to melting and thermal decomposition when heated to temperatures of at least about 3000° F. The mold 10 does not deflect or otherwise deform when the mold is heated to a temperature of at least about 3000° F. and force is applied against the mold. Thus, a one-piece composite article was formed of the silicone based material, in the manner previously explained, and had the same size and configuration as the mold 10. The one-piece composite article, which is identical to the mold 10, was heated to a temperature of approximately 5000° F. While the one-piece composite article was at a temperature of approximately 5000° F. or slightly less, the article was dropped through a distance of approximately 3 feet onto a concrete floor. There was no substantial deformation of the hot (approximately 5000° F.) article as a result of being dropped.

In addition, there was no significant thermal decomposition of the one-piece composite article corresponding to the mold 10 as a result of heating of the one-piece article. Thus, the aforementioned one-piece composite article, which is identical to the mold 10, did not undergo any significant thermal decomposition when it was heated to a temperature of approximately 5000° F. Although there was no significant thermal decomposition of the aforementioned composite article as a result of being heated to 5000° F., the filler material in the article was burned as the article was heated. Burning of the filler material merely darkened areas on the composite article and did not result in any significant changes in the structure of the article.

Article

Figure 3:
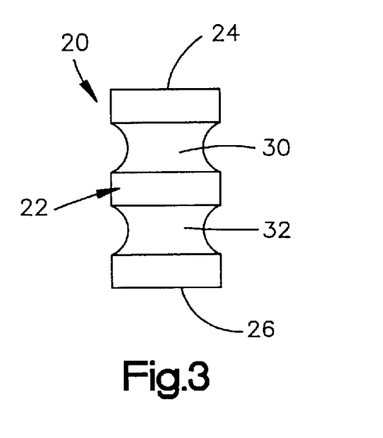
FIG. 3 is a schematic illustration of shaped article formed of silicone based material in accordances with another feature of the present invention.

In accordance with a second embodiment of the present invention the silicone based material can be used to form a shaped article rather than a mold for an article. FIG. 3 is a schematic illustration of a shaped article 20 prepared in accordance with the present invention. The shaped article has a generally cylindrical body 22 with a first circular end 24 and a second circular end 26. The body includes a first annular groove 30 and a second annular groove 32 that is axially spaced from the first groove.

Figure 4:
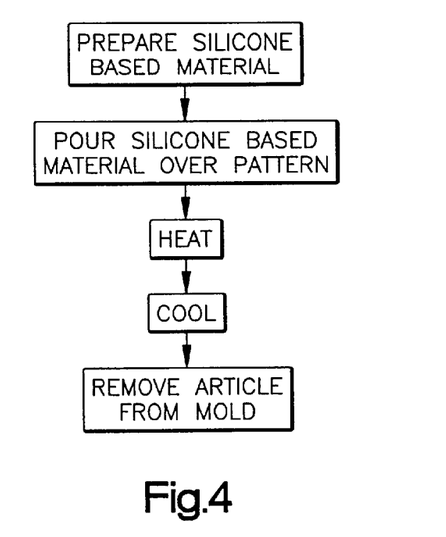
FIG. 4 is schematic block diagram of a method of forming the shaped article of FIG. 3.

FIG. 4 is a block flow diagram of a method of preparing the shaped article of FIG. 3. The block flow diagram of FIG. 4 for the shaped article 20 is similar to the block flow diagram of FIG. 2 for the mold 10. The shaped article 20 (FIG. 3) is prepared by mixing the silicone molding compound (MC550), the silicone resin, the catalyst, and filler, if utilized, to form the dry, particulate silicone based material. The dry silicone based material is a free flowing powder.

A mold is provided with a cavity. The mold can be any type of mold commonly used in molding a material. The mold may have a cope and drag section which define the mold cavity. The mold may be formed of a plurality of metal sections which are interconnected to form the mold cavity. The mold cavity has a size and shape corresponding to the size and shape of the article 20 of FIG. 3. The mold also includes a sprue or passage for admitting the particulate silicone based material into the mold. It is contemplated that the mold may have any one of many different known constructions.

The particulate silicone based material is transferred into the mold cavity until the mold cavity is filled with the particulate silicone based material. The particulate silicone based material is a free flowing powder and can be transferred into the mold cavity by pouring the particulate silicone based material through the sprue into the mold cavity. Pressure can be applied to the silicone based material to compact the silicone based material within the mold.

Thereafter, the mold containing the particulate silicone based material is placed in a conventional heating apparatus such as commercial oven and heated to a temperature of about 200° F. to about 400° F. for about thirty minutes. The mold and silicone based material therein are heated at a temperature of about 250° F. to about 350° F. until the particles of the silicone based material are interconnected to form the one-piece article 20 (FIG. 3).

During heating of the mold, pressure can maintained on the silicone based material. However, during heating of the mold containing the silicone based material to form the one-piece article 20, the silicone based material was merely packed into the mold and was not pressurized.

The mold with the silicone based material therein is removed from the oven and allowed to cool. Upon cooling to ambient temperature (approximately 70° F.), the silicone based material forms a rigid composite article 20. The sections of the mold are then separated from the rigid composite to release the shaped article 20 shown in FIG. 3.

If the shaped article 20 is removed from the mold before the shaped article cools to ambient temperature, the shaped article can be plastically deformed while it is still at a temperature between about 100° F. and about 200° F. This enables the shape which is imparted to the article 20 to be modified after the article has been removed from the mold.

Surprisingly, it has been found the shaped article 20 formed by this process has a consistency that allows it to be drilled and tapped. Drilling and tapping of the shaped article, permit the shaped article to be connected to fasteners, such as screws.

It is contemplated that the shaped article 20 may be utilized as an insulator for electrical wires. It is believed that the shaped article 20 will be particularly advantageous for use as an insulator for electrical wires in environments where electrical wires are exposed to relatively high temperatures and the wires are to conduct relatively high voltages. For example, an electrical wire conducting a voltage of approximately 1,000 volts could be wrapped at least part way around the groove 30 in the shaped article 20. A second electrical wire, also conducting approximately 1,000 volts, could be wrapped at least part way around the groove 32. The one-piece composite shaped article 20 is electrically insulating and prevents a flow of current between the two wires. The one-piece composite shaped article 20 remains electrically insulating when subjected to relatively high temperatures, that is, to temperatures in excess of 2,000° F. Of course, the shaped article 20 could be utilized as an insulator in environments where the shaped article 20 is not exposed to relatively high temperatures.

It is contemplated that the silicone based material of the present invention may be used to form mold and/or core patterns. The mold and/or core patterns would be utilized to shape mold material. Thus, mold and/or core patterns formed of the silicone based material would be utilized to form a mold cavity. The mold cavity would be filled with any material from which it is desired to form a mold.

Press Assembly

Figure 5:
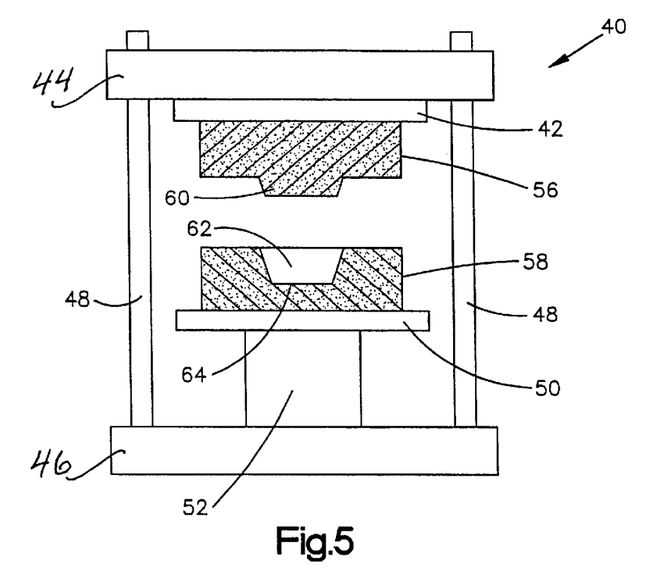
FIG. 5 is a schematic illustration of a press assembly for shaping silicone based material in accordance with another feature of the present invention.

A known press assembly 40 is illustrated schematically in FIG. 5 and may be utilized to shape the silicone based material of the present invention to a desired configuration. It should be understood that the press assembly 40 is illustrated schematically in FIG. 5 and is representative of many known types of compression molding press assemblies.

The press assembly 40 includes an upper platen 42 which is mounted on stationary upper frame member 44. The stationary upper frame member 44 is connected to a stationary lower frame member 46 by a plurality of upstanding posts 48. A lower platen 50 is mounted on a hydraulic plunger 52 which is operable to move the lower platen toward and away from the upper platen 42.

An upper mold section 56 is fixedly secured to the upper platen 42 and cooperates with a lower mold section 58. A projection 60 on the upper mold section 56 cooperates with a recess 62 in the lower mold section 58 to define a mold cavity when the lower mold section 58 is raised into engagement with the upper mold section 56 by the hydraulic plunger 52. The upper and lower mold sections 56 and 58 can be heated by conducting hot liquid through suitable passages in the mold sections. Similarly, the upper and lower mold sections can be cooled by conducting cold liquid through the passages in the mold sections.

When the press assembly 40 is to be utilized to form a solid one-piece composite article utilizing the particulate silicone based material previously described herein in association with FIGS. 1–4, the recess 62 in the lower mold section 58 is at least partially filled with the silicone based material. At this time, the silicone based material is at ambient temperature (about 70° F.). The hydraulic plunger 52 is then actuated to raise the lower mold section 58 so that the projection 60 on the upper mold section 56 enters the recess 62 and applies force against the silicone based material in the recess 62. The force applied against the silicone based material in the recess 62 will compress the particulate silicone based material in the recess 62 and reduce the volume occupied by the particulate silicone based material.

The particulate silicone based material in the recess 62 may be compressed with any desired pressure. Thus, upper and lower mold sections 56 and 58 may apply a very low pressure against the powdered silicone based material in the recess 62. Alternatively, the upper and lower mold sections 56 and 58 may apply a relatively high pressure against the powdered silicone based material in the recess 62. For example, the upper and lower mold sections 56 and 58 may apply a pressure of ten pounds per square inch (10 psi) against the silicone based material in the recess 62. Alternatively, the upper and lower mold sections 56 and 58 may apply a pressure of at least one thousand pounds per square inch (1,000 psi) against the silicone based material in the recess 62.

Once the silicone based material has been compressed in the recess 62, the upper and lower mold sections 56 and 58 are heated. This heat is conducted to the silicone based material in the mold cavity 64 formed between the upper and lower mold sections. The silicone based material in the mold cavity 64 is heated to a temperature between about 200° F. and about 400° F. In one specific instance, the silicone based material was heated to a temperature of approximately 300° F. After the silicone based material in the mold cavity 64 has been heated, the upper and lower mold sections 56 and 58 are cooled. This results in the formation of a solid one-piece composite article in the mold cavity 64.

The lower mold section 58 is then moved downward away from the upper mold section 56. The one-piece composite article can be removed from the recess 62 in the lower mold section 58. When the one-piece composite article is removed from the recess 62 it is still very warm, that is, at a temperature of between 120° F. and 200° F. At this time, plastic deformation of the one-piece composite article can be readily accomplished by the application of relatively small forces to the one-piece composite article. As the one-piece composite cools to ambient temperature (approximately 70° F.), the one-piece article becomes rigid and cannot be plastically deformed.

The solid composite article retains its desired configuration upon being heated to a temperature of at least about 3000° F. and the applying of force against the solid composite article. The solid composite article does not melt or thermally decompose when heated to a temperature of at least 3000° F. It is contemplated that the solid one-piece composite article can be formed with the press assembly 40 to have any one of many configurations suitable for any one of many different uses.

The greater the pressure which is applied against the silicone based material in the mold cavity 64 by the upper and lower mold sections 56 and 58, the finer are the particles which become interconnected to form the one-piece composite article and the smoother is the surface of the one-piece article. Thus, if relatively little pressure is applied against the silicone based material in the mold cavity 64, the one-piece article will be formed with relatively large particles and may have a granular appearing surface. Such a one-piece composite article is sufficiently porous to enable a liquid (water) to pass through the one-piece article.

However, if a relatively large pressure is applied to the silicone based material in the mold cavity 64, the one-piece composite article is formed with little or no growth of the particulate which forms the silicone based material. This results in the composite one-piece article having a smooth, glassy surface. The one-piece composite article which is formed in this manner is not porous and liquids will not flow through the article. Thus, by increasing the pressure applied against the silicone based material, the density of the one-piece composite article and the smoothness of the surface of the one-piece composite article can be increased.

In the foregoing explanation, the silicone based material was placed into the recess 62 in the lower mold section 58 and then heated. However, it is contemplated that the silicone based material could be heated, to a temperature of between about 200° F. and about 400° F. and then placed in the lower mold section 58. If this was done, the lower mold section 58 may also be heated to a temperature of between about 200° F. and about 400° F. to inhibit interconnection of particles of the silicone based material prior to closing of the upper and lower mold sections 56 and 58.

Injection Molding

Figure 6:
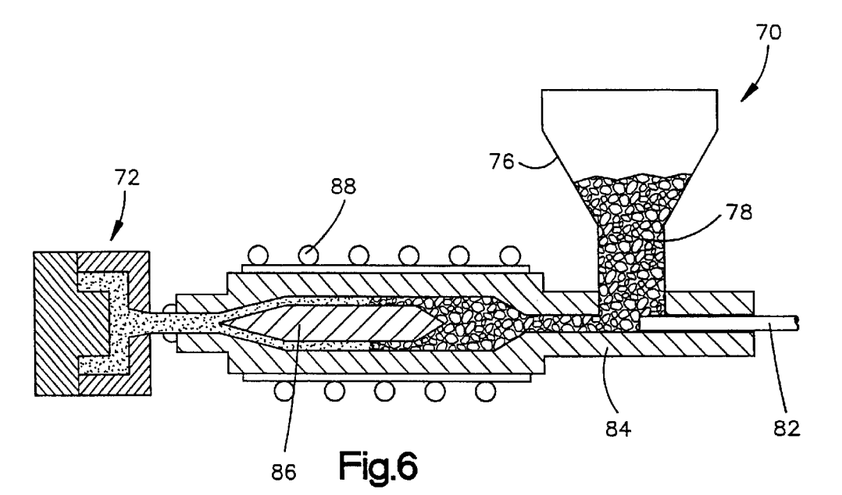
FIG. 6 is a schematic illustration of a ram fed injection is molding machine for shaping silicone based material in accordance with another feature of the present invention.

The press assembly 40 is illustrative of many known compression molding assemblies which may be utilized to form the silicone based material into a composite article having a desired configuration. A ram fed injection molding machine 70 of FIG. 6 is illustrative of many known types of injection molding machines which may be utilized in association with a mold assembly 72 to shape the silicone based material to form a composite article of a desired configuration. Known ram fed injection molding machines 70 are capable of injecting the silicone based material at pressures of one thousand pounds per square inch (1,000 psi) or more.

The ram fed injection molding machine 70 includes a hopper 76 which is filled with silicone based material 78. Although the silicone based material 78 has been illustrated schematically in FIG. 6 as having a relatively porous grain, it should be understood that the silicone based material 78 is fine grain and has a consistency similar to the consistency of confectionary sugar. The silicone based material 78 is formed in the manner previously described herein in association with FIGS. 1–4.

The ram fed injection molding machine 70 includes a ram 82 which is reciprocated axially relative to a tubular barrel 84 to force the silicone based material 78 along the barrel, past a torpedo or guide 86 and into the mold assembly 72 in a known manner. A heater 88 is provided in association with the barrel 84 to heat the silicone based material 78 as it moves along the barrel and is injected into the mold assembly 72. The heater 88 heats the silicone based material 78 to a temperature between about 200° F. and about 400° F. The mold assembly 72 may, itself, be heated. However, when the silicone based material is heated to a temperature between about 200° F. and 400° F. in the molding machine 70, the silicone based material may be injected into a mold 72 which is at ambient temperature.

It should be understood that the powdered silicone based material 78 could be moved along the barrel 84 by the ram 82 and injected into the mold assembly 72 without being heated. The powdered silicone based material 78 may be injected into the mold assembly at a pressure of 1,000 pounds per square inch or more. The mold assembly 72, once it is packed with the silicone based material 78, could be heated to a temperature between about 200° F. and about 400° F. This would result in a corresponding heating of the silicone based material in the mold assembly 72.

Extruding

In the embodiments illustrated in FIGS. 5 and 6, the silicone based material is been placed in a mold cavity to form a one-piece composite article having a configuration corresponding to the configuration of the mold cavity. In the embodiment illustrated in FIG. 7, the silicone based material is extruded to form a one-piece composite article with a desired configuration.

When the silicone based material of the present invention is to be extruded, the silicone based material is placed, in powder form, in a feed hopper 100 of a screw type extruder 102. The silicone based material placed in the feed hopper 100 is formed in the manner previously described herein in association with FIGS. 1–4.

Figures 7, 8:
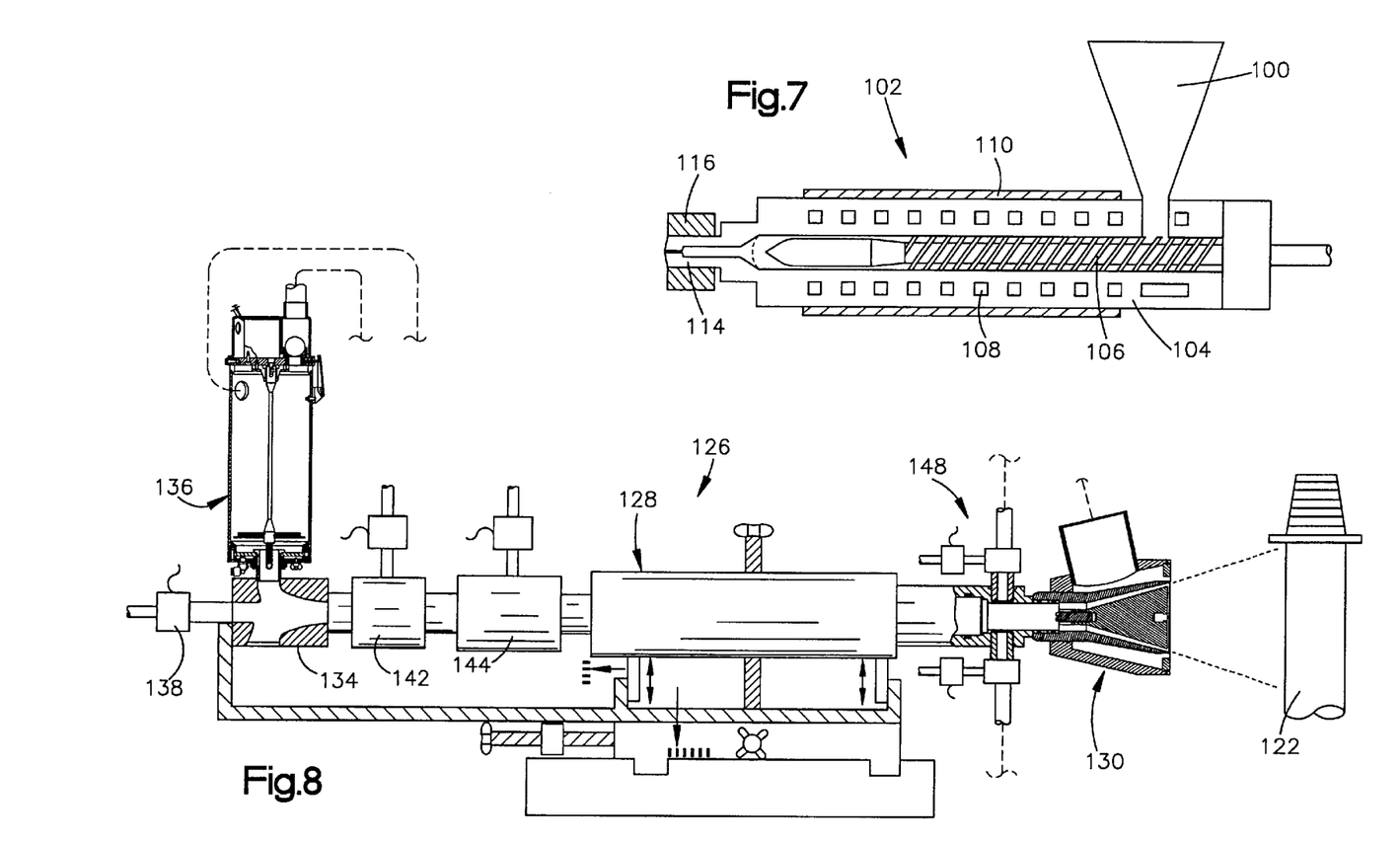
FIG. 7 is a schematic illustration of a screw type extruder for shaping silicone based material in accordance with another feature of the present invention.
FIG. 8 is a schematic illustration of an electrostatic spray apparatus for applying a covering of silicone based material in accordance with another feature of the present invention.

The screw type extruder 102 includes a barrel 104 in which an axially rotatable screw 106 is disposed. Cooling passages 108 may be provided in the barrel 104 of the extruder 102. A heater 110 extends around the outside of the barrel 104 and is effective to heat the silicone based material as it is moved along the barrel by the screw 106. A die 114 is provided at an outlet from the barrel 104 to impart a final configuration to the extruded silicone based material. A heater 116 is provided around the die 114.

The powdered silicone based material is initially placed in the feed hopper 100. Rotation of the screw 106 moves the powder toward the left (as viewed in FIG. 7). As the powder is moved toward the left, it is heated to a temperature of between about 200° F. and about 400° F. The heated silicone based material is forced through the die 114 to form a continuous elongated one-piece composite article having a cross sectional configuration corresponding to the cross sectional configuration of the die. When the one-piece article cools to ambient temperature, the one-piece extruded composite article resists melting and thermal decomposition when heated to temperatures of at least 3000° F. The elongated one-piece composite material extruded from the die 114 may be cut into desired lengths.

It should be understood that the screw type extruder 102, which has been illustrated schematically in FIG. 7, is representative of many different known types of extruders which could be utilized to impart a desired shape to the silicone based material.

Covering

In the embodiments of FIGS. 5–7, the silicone based material is shaped, using a die or mold, to form a one-piece article. In the embodiment of the invention illustrated in FIG. 8, the silicone based material is applied as a covering to a base member 122. The silicone based material which is used as a covering is formed in the manner previously described herein in association with FIGS. 1–4.

The illustrated base member 122 is a blade which will be a rotating component of a turbine engine. Rather than being applied to a rotating component, the covering could be applied to a base member which is a stationary component of a turbine engine. Thus, the base member 122 could be a portion of a turbine engine housing which is exposed to hot exhaust gases.

It should be understood that the base member 122 could be an article or an assembly which is intended for use in an environment other than a turbine engine. For example, the base member 122 could be a ladle or other item which is exposed to hot or molten metal. It should be understood that the base member 122 could be any desired article or assembly to which a heat resistant and/or electrically insulating covering is to be applied.

In the embodiment illustrated in FIG. 8, a known electrostatic spray apparatus 126 is utilized to apply the covering to the base member 122. The known electrostatic spray apparatus 126 includes a powder spray gun 128. A nozzle assembly 130 is connected with the spray gun 128 and directs a flow of fluid (air) entrained powder toward the base member 122. In addition to the nozzle assembly 130, the electrostatic spray apparatus 126 includes a venturi-type powder pump 134 which is connected with a powder feed container 136. The powder feed container holds the silicone based material formed in the manner previously explained. Upon actuation of a solenoid valve 138, air is conducted through the venturi type powder pump 134 and powder from the feed container 136 is entrained in the flow of air. An amplifier 142 is provided downstream from the powder pump 134. A diffuser 144 is provided downstream from the amplifier 142.

From the diffuser 144, the flow of air with powder entrained therein enters an electrostatic charging unit in the powder spray gun 128. A diverter assembly 148 is provided between the nozzle assembly 130 and the electrostatic charging unit in the spray gun 128. The diverter assembly 148 selectively interrupts the flow of powder to the nozzle assembly 130 to sharply define the trailing end of a pulse or puff of the powdered silicone based material to be applied to the base member 122.

It is contemplated that the electrostatic spray apparatus 126 may have any one of many different known constructions. The specific electrostatic spray apparatus 126 illustrated in FIG. 8 has the same construction as is disclosed in U.S. Pat. No. 5,520,735. Although the electrostatic spray apparatus 126 is stationary and the base member 122 is moved past the electrostatic spray apparatus, it is contemplated that the electrostatic spray apparatus could be a portable, handheld spray gun which is moved relative to the base member 122.

The flow of air entrained powdered silicone based material from the spray nozzle 130 is electrostatically charged. The base member 122 has an electrostatic charge which is opposite from the electrostatic charge on the particles of particles in the flow of air entrained powder from the nozzle assembly 130. Therefore, the particles of silicone based material adhere to the surface of the base member 122 and provide a covering over the surface of the base member 122.

With the illustrated electrostatic spray apparatus 126, the particles of powder in the flow of air entrained silicone based material from the nozzle assembly 130 is at ambient temperature (approximately 70° F.). Therefore, once the powder of silicone based material has been electrostatically applied to the base member 122, the base member and the covering of powdered silicone based material is heated to a temperature between about 200° F. and about 400° F. When the base member 122 and covering of silicone based material in powder form over the base member are heated, the particles of the silicone based material become interconnected and form a solid composite.

The base member 122 and the covering of silicone based material over the base member are then cooled to ambient temperature (approximately 70° F.). This results in the forming of a rigid one-piece covering of the silicone based material over the base member 122. This covering forms a one-piece composite article which is resistant to melting and thermal decomposition when heated to temperatures of at least 3000° F.

In the embodiment of FIG. 8, the one-piece covering of silicone based material is applied to the base member 122 using an electrostatic spray apparatus 126. However, it is contemplated that the solid composite covering of silicone based material could be applied to the base member 122 in a different manner if desired. For example, the base member 122 could be wetted and plunged into a container of the powdered silicone based material. Upon withdrawal of the base member from the container of silicone based material, a covering of particles of the powdered silicone based material would adhere to the base member. By heating the base member and the silicone based material to a temperature of between about 200° F. and about 400° F., the particles of the silicone base covering would become interconnected and form a rigid covering which is resistant to melting and thermal decomposition when heated to temperatures of at least about 3000° F.

A covering of the powdered silicone based material could be applied by forming separate elements, such as tiles or sheets, and connecting them with a base member. The separate elements could be connected with the base member by adhesive and/or mechanical fasteners. If desired, a slurry of the silicone based material could be applied to a base member with a brush and/or roller.

Example

This example illustrates the preparation of a shaped article in accordance with the present invention. The article may have any desired configuration.

About 950 grams of MC550BK1 was obtained. MC550BK1 is a silicone molding compound commercially available from GE Silicones of Waterford, N.Y. in the form of black particles having an average particle size similar to that of the granular particle used in roofing shingles. MC550BK1 includes, by weight of the MC550BK1, about 60% to about 80% amorphous fused silica powder, about 10% to about 30% fibrous glass, about 1% to about 5% amorphous silica, and about 10% to about 30% of siloxanes and silicones, including dimethyl polymers with phenyl silsequioxanes. The MC550BK1 was transferred to a conventional grinder and ground until the MC550BK1 had a consistency similar to that of baby powder. The powdered MC550BK1 was transferred from the grinder to a conventional mixing apparatus.

About 50 grams of TRIPLUS was added to and mixed with the powdered MC550BK1 in the mixing apparatus. TRIPLUS is a solventless liquid silicone resin blend system that is commercially available from GE Silicones of Waterford, N.Y. TRIPLUS includes a dimethylpolysiloxane silanol (TPR 178) and a methylsiloxane resin (TPR 179). The weight ratio of TPR 178 to TPR 179 in the TRIPLUS is about 1:1.

The liquid TRIPLUS mixed with the MC550BK1 wetted the powdered MC550BK1 and was absorbed by the powdered MC550BK1. Once the liquid TRIPLUS was absorbed by MC550BK1, 1 gram of a zirconium catalyst powder was added to added to and mixed with the TRIPLUS and the M550BK1.

About 350 grams of a filler material that includes talc filler with the tradename CANTAL and chopped fiberglass strands (8 microns in diameter by ¼ inch in length) was then added to and mixed with the mixture of MC550BK1, TRIPLUS, and zirconium catalyst.

The combined mixtures were transferred to a rotary blender and blended until the average particle size and the consistency of the mixture is similar to that of confectionary sugar.

A container was obtained and a pattern was placed in the container. The powdered silicone based material was poured over the pattern until the highest point of the pattern was covered by about ½ inch of the particulate silicone based material.

The container was placed in a conventional oven that had an oven temperature of about 300° F. The particles of the silicone based material became interconnected and formed a one-piece article (i.e., about 1 hour). The container and the one-piece composite article formed by the silicone based material were removed from the oven and allowed to cool to ambient temperature (i.e., about 75° F.). Upon being cooled to ambient temperature, the one-piece article was a rigid solid composite having the consistency of concrete. The container and the article defining pattern were separated from the one-piece solid composite article.

The one-piece composite article so formed had a smooth surface with no micro-irregularities. The one-piece composite article was heated in an oven to a temperature of at least about 3000° F. Upon being heated to a temperature of at least about 3000° F. the one-piece composite article was rigid and did not melt or thermally decompose. However, filler material in the one-piece composite article did burn.

Moreover, the one-piece composite article was exposed to a flame having a temperature of about 5000° F. The area of the one-piece composite article exposed to the flame did not melt or thermally decompose. Additionally, upon cooling the area of the one-piece composite article exposed to the flame exhibited no evidence of thermal shock, such as stress cracking.

It should be understood that the particulate silicone based material of the present invention could be utilized in many different ways to form many different types of articles. Thus, the silicone based material of the present invention may be used to form a mold and/or a core which is utilized to shape articles which may be formed of any desired material, such as mold material or metal.

The particulate silicone based material of the present invention may be shaped utilizing a mold, as illustrated in FIGS. 5 and 6. The particulate silicone based material of the present invention may be extruded, as illustrated in FIG. 7. The particulate silicone based material of the present invention may be used as a covering which is applied in any one of many different ways, including the apparatus of FIG. 8.

From the above description of the invention, those skilled in the art will perceive improvements, changes, and modifications in the invention. Such improvements, changes, and modifications within the skill of the art are intended to be covered by the appended claims.

Having described the invention, the following is claimed:

1. A method of forming a heat resistant composite, said method comprising the steps of:

providing a particulate silicone based material;

heating the particulate silicone based material to a temperature between about 200° F. and about 400° F.; and cooling the particulate silicone based material until a solid composite is formed, said solid composite being resistant to melting and thermal decomposition when heated to temperatures of at least about 3000° F.

2. The method of claim 1 wherein the particulate silicone based material comprises a silicone molding compound, a silicone resin, and a catalyst.

3. The method of claim 2 wherein the silicone molding compound comprises silica and a silsesquioxane polymer.

4. The method of claim 3 wherein the silicone molding compound comprises, by weight of the silicone molding compound:

about 60% to about 80% fused silica;

about 10% to about 30% fibrous glass;

about 1% to about 5% amorphous silica; and about 10% to about 30% of a dimethyl silicone with phenyl silsesquioxane.

5. The method of claim 2 wherein the silicone molding compound is a powder and the silicone resin is a liquid, said silicone resin when mixed with the silicone molding compound being capable of wetting the silicone molding compound and being absorbed by the silicone molding compound.

6. The method of claim 5 wherein the silicone resin is a polydiorganosiloxane homopolymer selected from the group consisting of a silanol terminated polydiorgansiloxane polymer, a methyl siloxane resin, and mixtures thereof.

7. The method of claim 6 wherein the silicone resin comprises a mixture of dimethylpolysiloxane silanol and a methyl siloxane resin, said mixture having a weight ratio of dimethylpolysiloxane silanol to methyl siloxane resin of about 1:2 to about 2:1.

8. The method of claim 2 wherein the catalyst is selected from the group consisting of zirconium, zinc octoate, cobalt octoate, iron octoate, and stannous octoate.

9. The method of claim 8 wherein the catalyst comprises zirconium or zinc octoate.

10. The method of claim 2 wherein the silicone based material comprises about 90% to about 98% by weight of the silicone molding compound, about 2% to about 10% by weight of the silicone resin, and about up to about 0.5% by weight of the catalyst, the weight % being based on the combined weight of the silicone molding compound, the silicone resin, and the catalyst.

11. The method of claim 2 wherein the silicone based material further comprises a filler material.

12. The method of claim 11 wherein the filler material is a fibrous material, a particulate material or a mixture thereof.

13. The method of claim 11 wherein the weight % of filler in the silicone based material is up to about 35% by weight based on the combined weight of the silicone molding compound, the silicone resin, the catalyst, and the filler material.

14. A particulate material for forming a heat resistant article, said particulate material comprising:
   a silicone based material;
      said silicone based material upon being heated to a temperature of between about 200° F. and about 400° F. curing and forming a solid composite, said solid composite being resistant to melting and thermal decomposition when heated to temperatures of at least about 3000° F.

15. The particulate material of claim 14 wherein said silicone based material comprises a silicone molding compound, a silicone resin, and a catalyst.

16. The particulate material of claim 15 wherein the silicone molding compound comprises silica and a silsesquioxane polymer.

17. The particulate material of claim 15 wherein the silicone transfer molding compound comprises silica and a silsesquioxane polymer;
   about 60% to about 80% fused silica;
   about 10% to about 30% fibrous glass;
   about 1% to about 5% amorphous silica; and
   about 10% to about 30% of a dimethyl silicone with phenyl silsesquioxane.

18. The particulate material of clam 15 wherein the silicone molding compound is a solid and the silicone resin is a liquid, said silicone resin when mixed with the silicone molding compound being capable of wetting the silicone molding compound and being absorbed by the silicone molding compound.

19. The particulate material of claim 15 wherein the silicone resin is a polydiorganosiloxane homopolymer selected from the group consisting of a silanol terminated polydiorgansiloxane polymer, a methyl siloxane resin, and mixtures thereof.

20. The particulate material of claim 19 wherein the silicone resin comprises a mixture of dimethylpolysiloxane silanol and a methyl siloxane resin, said mixture having a weight ratio of dimethylpolysiloxane silanol to methyl siloxane resin of about 1:2 to about 2:1.

21. The particulate material of claim 15 wherein the catalyst is selected from the group consisting of zirconium, zinc octoate, cobalt octoate, iron octoate, and stannous octoate.

22. The particulate material of claim 21 wherein the catalyst comprises zirconium or zinc octoate.

23. The particulate material of claim 15 wherein the silicone based material comprises about 90% to about 98% by weight of the silicone molding compound, about 2% to about 10% by weight of the silicone resin, and about up to about 0.5% by weight of the catalyst, the weight % being based on the combined weight of the silicone molding compound, the silicone resin, and the catalyst.

24. The particulate material of claim 15 wherein the silicone based material further comprises a filler material.

25. The particulate material of claim 24 wherein the filler material is a fibrous material, a particulate material or a mixture thereof.

26. A method as set forth in claim 1 further including the step of shaping the particulate silicone based material to a desired configuration prior to heating of the particulate silicone based material to a temperature of between 200° F. and 400° F.

27. A method as set forth in claim 1 further including the step of shaping the particulate silicone based material to a desired configuration after the particulate silicone based material has been heated to a temperature of between about 200° F. and about 400° F.

28. A method as set forth in claim 1 further including the step of placing the particulate silicone based material in a cavity to form a body of powder having a configuration corresponding to the configuration of the cavity.

29. A method as set forth in claim 28 wherein said step of placing the particulate silicone based material in a cavity includes conducting a flow of discrete particles into the cavity, said step of cooling the particulate silicone based material until a solid composite is formed is at least partially performed with the particulate silicone based material in the cavity.

30. A method as set forth in claim 28 wherein said step of cooling the particulate silicone based material until a solid composite article is formed includes removing a solid composite article from the cavity before the particulate silicone based material has cooled to ambient temperature and while the solid composite is manually malleable.

31. A method as set forth in claim 28 wherein said step of placing the particulate silicone based material in a cavity includes packing discrete particles in the cavity by applying pressure against the discrete particles while the discrete particles are disposed in the cavity.

32. A method as set forth in claim 28 wherein said step of placing the particulate silicone based material in a cavity includes conducting a flow of particles forming the particulate silicone based material into the cavity and applying pressure against particulate silicone based material in the cavity.

33. A method as set forth in claim 28 wherein said step of placing the particulate silicone based material in a cavity includes at least partially filling the cavity with the particulate silicone based material and reducing a volume occupied by the particulate silicone based material in the cavity.

34. A method as set forth in claim 1 further including the step of applying a covering of the particulate silicone based material to at least a portion of a base member, said step of heating the particulate silicone based material is at least partially performed with the particulate silicone based material disposed on the base member, said step of cooling the particulate silicone based material until a solid composite is formed is performed with the particulate silicone based material disposed on the base member.

35. A method as set forth in claim 1 further including the steps of electrostatically charging particles of the particulate silicone based material, directing a flow of electrostatically charged particles of the particulate silicone based material toward a base member, and electrostatically adhering the charged particles of particulate silicone based material to the base member, said step of heating the particulate silicone based material is at least partially performed with the particulate silicone based material electrostatically adhering to the base member, said step of cooling the particulate silicone based material until a solid composite is formed is performed with the particulate silicone based material disposed on the base member.

36. A method as set forth in claim 1 wherein said step of heating the particulate silicone based material includes forming particles of a relatively large size by interconnecting particles of a relatively small size, the relative large size particles being interconnected to form a one-piece article.

37. A method as set forth in claim 1 wherein said step of providing a particulate silicone based material includes mixing a powdered silicone molding compound containing silica powder with a liquid silicone resin, and absorbing the liquid silicone resin with the powdered silicone molding compound to form a dry particulate which flows so as to conform to the configuration of a container in which the dry particulate is placed.

38. A method as set forth in claim 1 further including the step of injection molding the particulate silicone base material.

39. A method as set forth in claim 1 further including the step of extruding the silicone based material.

40. A method as set forth in claim 1 wherein said step of providing particulate silicone based material includes mixing a powdered silicone molding compound containing silica powder with a liquid silicone resin and absorbing the liquid silicone resin with the silicone molding compound to form the particulate silicone based material.

41. A method as set forth in claim 1 further including forming a mold with the particulate silicon e based material, conducting a flow of molten metal into the mold formed of the particulate silicone based material, and solidifying the molten metal in the mold to form an article, said step of solidifying the molten metal to form an article includes solidifying the molten metal with at least a portion of the molten metal in engagement with surface area of the mold formed by the particulate silicone based material.

42. A method as set forth in claim 1 wherein said step of heating the particulate silicone based material includes interconnecting particles of the particulate to form a one-piece element.

43. A method as set forth in claim 1 further including the steps of providing a base member, and applying the particulate silicone based material to at least a portion of the base member, said step of heating the particulate silicone based material is performed with the particulate silicone based material disposed on the base member.

44. A method as set forth in claim 43 further including the step of heating the base member to a temperature between about 200° F. and about 400° F. prior to applying the particulate silicone based material to the base member.

45. A method as set forth in claim 43 wherein the particulate silicone based material is at a temperature between 200° F. and about 400° F. during performance of said step of applying the particulate silicone based material to the base member.

46. A method as set forth in claim 1 further including the steps of providing a turbine engine component, and applying the particulate silicone based material to at least a portion of the turbine engine component, said steps of heating the particulate silicone based material and cooling the particulate silicone based material include forming a covering over at least a portion of the turbine engine component.

47. A method as set forth in claim 1 further including the step of shaping the particulate silicone based material to a configuration corresponding to the configuration of a one-piece element prior to heating the particulate silicone based material.

48. A method as set forth in claim 47 wherein said step of shaping the particulate silicone based material includes placing the particulate silicone based material in a cavity having a configuration which corresponds to a desired configuration of at least a portion of an element to be formed of the particulate silicone based material.

49. A method as set forth in claim 48 wherein said step of heating the particulate silicone based material to a temperature of between about 200° F. and about 400° F. is at least partially performed while the particulate silicone based material is disposed in the cavity.

50. A method as set forth in claim 48 wherein said step of heating the particulate silicone based material to a temperature of between abut 200° F. and about 400° F. is at least partially performed prior to placing of the particulate in silicone based material In the cavity.

51. A method as set forth in claim 48 wherein said step of placing the particulate silicone based material in a cavity includes conducting a flow of discrete particles of the particulate silicone based material into the cavity.

52. A method as set forth in claim 48 wherein said step of placing the particulate silicone based material in a cavity includes urging the particulate silicone based material into the cavity under the influence of a pressure of at least one thousand pounds per square inch (1,000 psi).

53. A method as set forth in claim 48 wherein said step of heating the particulate silicone based material to a temperature between about 200° F. and about 400° F. is performed at least until particles of the particulate silicone based material become interconnected to form a one-piece element while the particulate silicone based material is in the cavity, said method further includes removing the element from the cavity while the element is plastically deformable, and applying force against the element after the element is outside the cavity to plastically deform the element before cooling the element to an extent sufficient to result in the element becoming rigid.

54. A method as set forth in claim 48 wherein said step of placing the particulate silicone based material in a cavity includes packing the particulate silicone based material into the cavity by applying force against the particulate silicone base material while the particulate silicone based material is in the cavity.

55. A method as set forth in claim 1 further including the step of injection molding the particulate silicone base material at a pressure of at least one thousand pounds per square inch (1,000 psi) while the particulate silicone based material is at a temperature between about 200° F. and about 400° F.

56. A method as set forth in claim 1 further including the step of extruding the particulate silicone based material so as to form an article having a configuration corresponding to a desired configuration.

* * * * *